(12) United States Patent
Chen et al.

(10) Patent No.: US 9,554,077 B2
(45) Date of Patent: Jan. 24, 2017

(54) CHANNEL LOADING METHOD, DISPLAY DEVICE, AND NON-TRANSIENT STORAGE MEDIUM

(71) Applicants: BOE TECHNOLOGY GROUP CO., LTD., Beijing (CN); BEIJING BOE DISPLAY TECHNOLOGY CO., LTD., Beijing (CN)

(72) Inventors: Min Chen, Beijing (CN); Bendeng Lv, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 0 days.

(21) Appl. No.: 14/366,936

(22) PCT Filed: Dec. 16, 2013

(86) PCT No.: PCT/CN2013/089585
§ 371 (c)(1),
(2) Date: May 1, 2015

(87) PCT Pub. No.: WO2015/018162
PCT Pub. Date: Feb. 12, 2015

(65) Prior Publication Data
US 2015/0229871 A1    Aug. 13, 2015

(30) Foreign Application Priority Data
Aug. 9, 2013    (CN) .......................... 2013 1 0346674

(51) Int. Cl.
*H04N 21/43* (2011.01)
*H04N 21/44* (2011.01)
(Continued)

(52) U.S. Cl.
CPC ............ *H04N 5/50* (2013.01); *H04N 21/4221* (2013.01); *H04N 21/42213* (2013.01);
(Continued)

(58) Field of Classification Search
None
See application file for complete search history.

(56) References Cited

U.S. PATENT DOCUMENTS 6,785,903 B1 *    8/2004    Kuh ................. H04N 21/23608
370/486
2001/0044855 A1 *  11/2001    Vermeire ................. H04L 29/06
719/310
(Continued)

FOREIGN PATENT DOCUMENTS

| CN | 101600059 A | 12/2009 |
|----|-------------|---------|
| CN | 101873407 A | 10/2010 |

(Continued)

OTHER PUBLICATIONS

Office Action in Chinese Patent Application No. 201310346674.2, dated Nov. 26, 2015.
(Continued)

*Primary Examiner* — Michael Teitelbaum
(74) *Attorney, Agent, or Firm* — Bakerhostetler LLP

(57) ABSTRACT

One embodiment of the present invention is a channel loading method, comprising: storing channel parameters; generating a channel loading instruction according to a status of an operation menu and a user instruction; acquiring the channel parameters when the channel loading instruction is obtained, and loading the acquired channel parameters into a television service list database. Another embodiment is a display device having a channel parameter storing module and a channel loading method. A non-transient storage medium is also a part of the present invention.

15 Claims, 1 Drawing Sheet

(51) Int. Cl.
*H04N 5/50* (2006.01)
*H04N 21/434* (2011.01)
*H04N 21/422* (2011.01)
*H04N 21/438* (2011.01)
*H04N 21/441* (2011.01)
*H04N 21/482* (2011.01)

(52) U.S. Cl.
CPC ..... *H04N 21/4345* (2013.01); *H04N 21/4384* (2013.01); *H04N 21/441* (2013.01); *H04N 21/482* (2013.01)

(56) References Cited

U.S. PATENT DOCUMENTS

2007/0009229 A1* 1/2007 Liu ................ H04N 21/488
 386/230
2007/0237105 A1 10/2007 Onomatsu
2013/0305289 A1* 11/2013 Patel ................ H04N 5/44543
 725/44

FOREIGN PATENT DOCUMENTS

| | | |
|---|---|---|
| CN | 102202193 A | 9/2011 |
| CN | 102523478 A | 6/2012 |
| CN | 202424881 U | 9/2012 |
| CN | 103428573 A | 12/2013 |
| JP | 2002-319210 A | 10/2002 |

OTHER PUBLICATIONS

International Search Report and Written Opinion in PCT International Application No. PCT/CN2013/089585, dated May 26, 2014.
Office Action in Chinese Patent Application No. 201310346674.2, dated May 9, 2016.

* cited by examiner

CHANNEL LOADING METHOD, DISPLAY DEVICE, AND NON-TRANSIENT STORAGE MEDIUM

CROSS-REFERENCE TO RELATED APPLICATION

This application is the U.S. national phase of PCT Application No. PCT/CN2013/089585 filed on Dec. 16, 2013, which claims priority to Chinese Patent Application No. 201310346674.2 filed on Aug. 9, 2013, the disclosures of which are incorporated in their entirety by reference herein.

BACKGROUND OF THE INVENTION

Field of the Invention

This disclosure relates to the field of display device technologies, and in particular, to a channel loading method, a channel loading apparatus, a display device, a computer program, and a storage medium.

Description of the Prior Art

Before normal use of a display device, television channels need to be searched using an automatic channel search function of the display device. It takes a period of time to search one channel on the display device by means of frequency modulation. Accordingly, much time is consumed in channel searching. This problem is prominent in the factory manufacture test phase of the display device, because in this phase, product test personnel will spend a large amount of time in channel searching, and the time for channel searching is fixed and may not change with the proficiency level of the product test personnel. As a result, the product test personnel spend too much time during the channel test for the display device, and thus the channel test efficiency is low. The display device may be a television or another product device capable of receiving a broadcast signal and having the channel receiving function.

SUMMARY OF THE INVENTION

I. Technical Problem to be Solved

The present disclosure provides a channel loading method, a channel loading apparatus, a display device, a computer program, and a storage medium, to solve the problem that channel searching in a display device consumes two much time.

II. Technical Solutions

The present disclosure employs technical solutions as follows:

An embodiment of the present invention provides a channel loading method, comprising:
storing channel parameters;
generating a channel loading instruction according to a status of an operation menu and a user instruction; and
acquiring the channel parameters when the channel loading instruction is obtained, and loading the acquired channel parameters into a television service list database.

Further, in the channel loading method according to the embodiments of the present invention, the generating a channel loading instruction according to a status of an operation menu and a user instruction specifically comprises:

generating the channel loading instruction when the operation menu is in an open state and the user instruction comprises a direct channel loading instruction.

Further, in the channel loading method according to the embodiments of the present invention, the generating a channel loading instruction according to a status of an operation menu and a user instruction specifically comprises:

generating the channel loading instruction when the operation menu is in an open state and a channel loading password comprised in the user instruction is correct.

Further, in the channel loading method according to the embodiments of the present invention, after the loading the acquired channel parameters into a television service list database, the method further comprises:

switching a channel to a predetermined specific channel.

Further, the channel parameter may comprise a channel list, the channel list comprising: customer channel quantity, channel frequency, internal channel quantity, modulation mode, channel type, channel name, television system, audio system, and color system.

Further, in the channel loading method according to the embodiments of the present invention, the user instruction is sent by a remote control.

Accordingly, an embodiment of the present invention provides a channel loading apparatus, comprising:
a channel parameter storing module, configured to store channel parameters;
a channel loading module, configured to generate a channel loading instruction according to a status of an operation menu and a user instruction; and
a television service list database module, configured to acquire the channel parameters when the channel loading instruction is obtained, and load the acquired channel parameters into a television service list database.

Further, in the channel loading apparatus according to the embodiments of the present invention, the channel loading module comprises:

a special key input determining module, configured to generate the channel loading instruction when the operation menu is in an open state and the user instruction comprises a direct channel loading instruction.

Further, in the channel loading apparatus according to the embodiments of the present invention, the channel loading module comprises:

a password input determining module, configured to generate the channel loading instruction when the operation menu is in an open state and a channel loading password comprised in the user instruction is correct.

Further, the channel loading apparatus according to the embodiments of the present invention further comprises:

a channel switching module, configured to switch a channel to a predetermined specific channel.

An embodiment of the present invention provides a display device, comprising the channel loading apparatus according to the present disclosure.

An embodiment of the present invention provides a computer program, which, when being executed by a processor, causes a computer device to perform the channel loading method according the present disclosure.

An embodiment of the present invention provides a non-transient storage medium, which stores the computer program according to the present disclosure.

III. Beneficial Effects

According to the channel loading method and the channel loading apparatus provided in the present disclosure, after a user presses a direct channel loading key on a remote control, or after a user inputs a correct channel loading password over the password input keyboard of a remote control, the channel loading apparatus loads predetermined channels, thereby saving time for channel searching. In this way, during product test of display devices in factories, the channel detection efficiency is improved, the working cost is reduced, and manufacture benefits are increased.

DETAILED DESCRIPTION OF THE PREFERRED EMBODIMENTS

The present disclosure is further described with reference to the drawings and exemplary embodiments. The following embodiments are merely for illustrating the present invention, rather than limiting the scope of the present invention.

For a better understanding of the embodiments of the present invention, the embodiments are further described with reference to drawings and illustrative embodiments.

Figure 1:
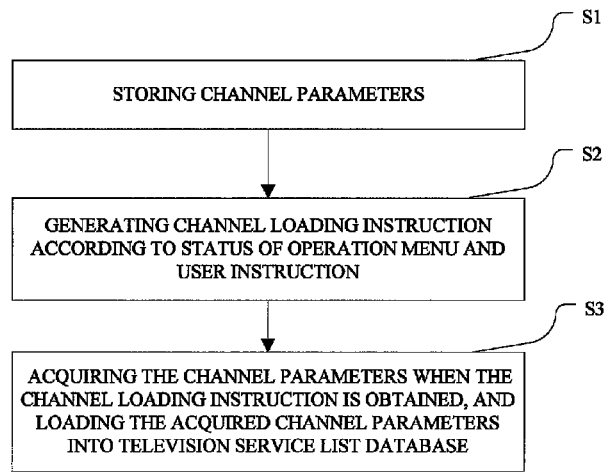
FIG. 1 is a schematic flowchart of a channel loading method according to an embodiment of the present invention.

An embodiment of the present invention provides a channel loading method. FIG. 1 is a schematic flowchart of the channel loading method according to an embodiment of the present invention. As illustrated in FIG. 1, the method comprises:

step S1, storing channel parameters;

step S2, generating a channel loading instruction according to a status of an operation menu and a user instruction; and step S3, acquiring the channel parameters when the channel loading instruction is obtained, and loading the acquired channel parameters into a television service list database.

Specifically, in step S3, the loading the acquired channel parameters into a television service list database comprises:

step S301, locking the television service list database: setting a lock write identity to prohibit other functions from performing an operation on the television service list database;

step S302, updating the television service list database by using the channel parameters; and step S303, unlocking the television service list database: canceling the lock write identity to allow other functions to perform an operation on the television service list database.

In step S1, the channel parameters are stored into a storage chip inside the display device (for example, a display). The storage chip comprises a program area and a data area. The specific step for storing the channel parameters may be: burning the channel parameters into the program area of the storage chip, and inputting and storing the channel parameters stored in the program area of the storage chip into the data area of the storage chip.

The remote control sends the user instruction. The user instruction comprises: a direct channel loading instruction and a channel loading password. The remote control correspondingly comprises: a direct channel loading key and a password input keyboard. The keyboard comprises a plurality of keys. The specific step of sending by the remote control the user instruction comprises the following steps:

When the direct channel loading key is pressed, the remote control sends the user instruction to the channel loading module, wherein the user instruction comprises a direct channel loading instruction.

When the password input keyboard is operated by a user, the remote control sends the user instruction to the channel loading module, wherein the user instruction comprises a channel loading password. The channel loading password is acquired according to an operation event of the user on the password input keyboard.

To prevent user's incorrect operations, when receiving the user instruction, the channel loading module needs to determine whether the operation menu of the display device is in an opened state. If the operation menu of the display device is in the opened state, the channel loading module considers that the user performs a correct operation and that the channel loading operation is allowed; otherwise, the channel loading module considers that the user performs an incorrect operation and that the channel loading operation is not allowed, and terminates the channel loading operation.

The channel parameter storing module, i.e., the above-described storage chip inside the display device, pre-stores channel parameters of various manufacture origins. The channel parameters may comprise a channel list. The channel list comprises nine parts of data: customer channel quantity (the serial number of the current channel displayed on the television menu), channel frequency (the modulation frequency of the current channel), internal channel quantity (the number of channels that is defined in the transmission stream when the current channel is a digital channel), modulation mode (the modulation mode in which the television station transmits the current channel), channel type (indicating whether the current channel is a digital channel or an analog channel), channel name (the channel name character string that is defined in the transmission stream when the current channel is a digital channel), television system, audio system, and color system. These nine parts of data form complete channel parameters. A channel may be loaded only by loading the data into the display device.

According to the above technical solution, after a user presses a direct channel loading key on a remote control, or after a user inputs a correct channel loading password over the password input keyboard of a remote control, the channel loading apparatus loads predetermined channels, thereby saving time for channel searching. In this way, during product test of display devices in factories, the channel detection efficiency is improved, the working cost is reduced, and manufacture benefits are increased.

In practice, the channel loading method and system according to the embodiments of the present invention mainly apply to channel detection during factory product test of the display device. The channel refers to a factory channel, which is different from a common channel of a common display device. The common channel in the common display device generally refers to a frequency-fixed channel provided by a broadcast sending apparatus of a television station, and the user may search out the channel and watch, over the channel, television programs that are broadcast and sent by the television station. During channel detection in the factory test phase, the factory channel generally refers to a channel that is set for testing the channel function of the display device and comprises channels having a specific parameters. The channel parameters of the factory channel are much different from those of the common channel. The channel loading method and system according to the embodiments of the present invention mainly apply to the field of channel detection. Since loading of the factory channels is only performed in the factory test phase, the user needs to be prevented from performing such loading operation during normal use, and thus a channel loading password needs to be set. The channel loading operation may be performed on the premise that the password is correct. In addition, a judgment needs to be conducted according to the status of the operation menu, to prevent the user from loading the predetermined factory channels.

Further, in the channel loading method according to the embodiments of the present invention, the generating a channel loading instruction according to a status of an operation menu and a user instruction specifically comprises:

step S201, generating the channel loading instruction when the operation menu is in an open state and the user instruction comprises a direct channel loading instruction.

Preferably, after a direct channel loading key is set on the remote control, the test personnel does not need to input the password again, thereby saving the time.

Further, in the channel loading method according to the embodiments of the present invention, the generating a channel loading instruction according to a status of an operation menu and a user instruction specifically comprises:

step S202, generating the channel loading instruction when the operation menu is in an open state and a channel loading password comprised in the user instruction is correct.

The password input keyboard on the remote control prevents incorrect operations of the user, and avoids loading factory channels due to incorrect operations by non-test personnel.

Further, in the channel loading method according to the embodiments of the present invention, after the loading the acquired channel parameters into a television service list database, the method further comprises:

step S4, switching a channel to a predetermined specific channel.

Upon completion of channel loading on the display device, the channel is automatically switched to a predetermined specific channel, for example, a first channel. In this way, the channel detection time is saved, and the product test personnel do not need to manually switch the channel.

Figure 2:
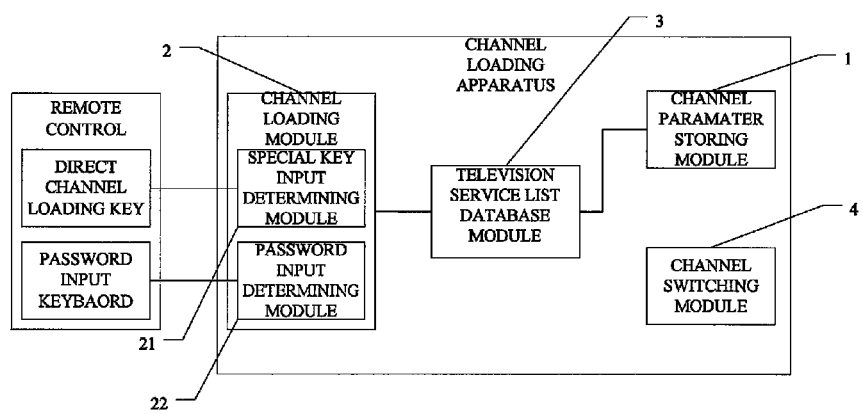
FIG. 2 is a schematic structural view of a channel loading apparatus according to an embodiment of the present invention.

Accordingly, an embodiment of the present invention provides a channel loading apparatus. FIG. 2 is a schematic structural view of a channel loading apparatus according to an embodiment of the present invention. As illustrated in FIG. 2, the apparatus comprises:

a channel parameter storing module 1, configured to store channel parameters;

a channel loading module 2, configured to generate a channel loading instruction according to a status of an operation menu and a user instruction; and a television service list database module 3, configured to acquire the channel parameters when the channel loading instruction is obtained, and load the acquired channel parameters into a television service list database.

The channel loading module 2 may also comprise a temporary storing module, wherein the temporary storing module is configured to temporarily store the user instruction, such that the special key input determining module 21 and the password input determining module 22 acquire the user instruction from the temporary storing module. The user instruction comprises a direct channel loading instruction or a channel loading password.

Further, in the channel loading apparatus according to the embodiments of the present invention, the channel loading module 2 comprises:

a special key input determining module 21, configured to generate the channel loading instruction when the operation menu is in an open state and the user instruction comprises a direct channel loading instruction.

Further, in the channel loading apparatus according to the embodiments of the present invention, the channel loading module 2 comprises:

a password input determining module 22, configured to generate the channel loading instruction when the operation menu is in an open state and a channel loading password comprised in the user instruction is correct.

Further, the channel loading apparatus according to the embodiments of the present invention further comprises:

a channel switching module 4, configured to switch a channel to a predetermined specific channel.

The channel switching module sends an instruction to the display device such that the display device switches the channel to the predetermined specific channel.

The technical solution of the above-described channel loading apparatus is a hardware implementation structure of the channel loading method according to the embodiments of the present invention. The basic principles of the apparatus are similar to those of the channel loading method according to the embodiments of the present invention, which are not described herein any further.

An embodiment of the present invention provides a display device, comprising the channel loading apparatus according to the embodiments of the present invention.

The display device may be a liquid crystal panel, an electronic paper, an organic light-emitting diode (OLED) panel, a liquid crystal display (LCD) television, a liquid crystal display (LCD), a digital photo frame, a mobile phone, a tablet computer, and other products or components having the display function.

An embodiment of the present invention provides a computer program, which; when being executed by a processor, causes a computer device to perform the channel loading method according the present invention.

In addition, the channel loading method may be implemented by reading a computer program configured to perform the channel loading method according to the embodiments of the present invention and by loading the computer program into a non-volatile memory, for example, a read-only memory (ROM) or a hard disk. The computer program is channel loading processing program stored in a computer-readable storage medium. The computer-readable storage medium may be, for example, a ROM, an electrically erasable programmable read-only memory (EEPPROM), an erasable programmable read-only memory (EPROM), a flash memory, a flexible disk, a compact disc read-only memory (CD-ROM), a compact disc-rewritable (CD-RW), a digital versatile disc (DVD), secure digital (SD) card, or a magneto-optical (MO) disc. The channel loading processing program is a computer-executable program compiled using a traditional programming language or an object-oriented programming language, for example, an assembly language, C, C++, C#, and Java (registered trademark), and may be stored in the above-listed storage media and distributed therein.

The embodiments described above are merely for illustrating the present invention, and are not intended to limit the present invention. Persons of ordinary skill in the art may derive various changes and variations without departing from the spirit and scope of the present invention. Such equivalent technical solutions shall pertain to the protection scope of the present invention.

What is claimed is:

1. A channel loading method which is applied to factory channel detection during factory product test, comprising:
   storing channel parameters of a factory channel;
   generating a channel loading instruction according to a status of an operation menu and a user instruction; and
   acquiring the channel parameters of the factory channel when the channel loading instruction is obtained, and loading the acquired channel parameters of the factory channel into a television service list database,
   wherein the channel parameter of the factory channel comprises a channel list; and
   wherein the channel list comprises: customer channel quantity, channel frequency, internal channel quantity, modulation mode, channel type, channel name, television system, audio system, and color system.

2. The channel loading method according to claim 1, wherein the generating a channel loading instruction according to a status of an operation menu and a user instruction comprises:
   generating the channel loading instruction when the operation menu is in an open state and the user instruction comprises a direct channel loading instruction.

3. The channel loading method according to claim 1, wherein the generating a channel loading instruction according to a status of an operation menu and a user instruction comprises:
   generating the channel loading instruction when the operation menu is in an open state and a channel loading password comprised in the user instruction is correct.

4. The channel loading method according to claim 1, wherein after the loading the acquired channel parameters of the factory channel into a television service list database, the method further comprises:
   switching a channel to a predetermined specific channel.

5. The channel loading method according to claim 1, wherein the user instruction is sent by a remote control.

6. A display device which is subject to channel detection during factory product test, comprising:
   a hardware storage, configured to store computer program instructions;
   a processor, which is coupled with the hardware storage,
   wherein the following modules are achieved, when the computer program instructions stored in the hardware storage are called and executed by the processor,
   a channel parameter storing module configured to store channel parameters of a factory channel;
   a channel loading module configured to generate a channel loading instruction according to a status of an operation menu and a user instruction; and
   a television service list database module configured to acquire the channel parameters of the factory channel when the channel loading instruction is obtained, and load the acquired channel parameters of the factory channel into a television service list database,
   wherein the channel parameter of the factory channel comprises a channel list; and
   wherein the channel list comprises: customer channel quantity, channel frequency, internal channel quantity, modulation mode, channel type, channel name, television system, audio system, and color system.

7. The display device according to claim 6, wherein the channel loading module comprises:
   a special key input determining module configured to generate the channel loading instruction when the operation menu is in an open state and the user instruction comprises a direct channel loading instruction.

8. The display device according to claim 6, wherein the channel loading module comprises:
   a password input determining module configured to generate the channel loading instruction when the operation menu is in an open state and a channel loading password comprised in the user instruction is correct.

9. The display device according to claim 6, further comprising:
   a channel switching module configured to switch a channel to a predetermined specific channel.

10. The display device according to claim 6, wherein the user instruction is sent by a remote control.

11. A non-transitory storage medium, storing the computer program instructions which is applied to channel detection during factory product test, wherein the following modules are achieved, when the computer program instructions are called and executed,
    a channel parameter storing module configured to store channel parameters of a factory channel;
    a channel loading module configured to generate a channel loading instruction according to a status of an operation menu and a user instruction; and
    a television service list database module configured to acquire the channel parameters of the factory channel when the channel loading instruction is obtained, and load the acquired channel parameters of the factory channel into a television service list database,
    wherein the channel parameter of the factory channel comprises a channel list; and
    wherein the channel list comprises: customer channel quantity, channel frequency, internal channel quantity, modulation mode, channel type, channel name, television system, audio system, and color system.

12. The non-transitory storage medium according to claim 11, wherein the channel loading module comprises:
    a special key input determining module configured to generate the channel loading instruction when the operation menu is in an open state and the user instruction comprises a direct channel loading instruction.

13. The non-transitory medium according to claim 11, wherein the channel loading module comprises:
    a password input determining module configured to generate the channel loading instruction when the operation menu is in an open state and a channel loading password comprised in the user instruction is correct.

14. The non-transitory storage medium according to claim 11, further comprising:
    a channel switching module configured to switch a channel to a predetermined specific channel.

15. The non-transitory storage medium according to claim 11, wherein the user instruction is sent by a remote control.

* * * * *